US010838893B2

(12) United States Patent
Dominguez et al.

(10) Patent No.: US 10,838,893 B2
(45) Date of Patent: Nov. 17, 2020

(54) METHODS FOR MITIGATING SYSTEM INTERRUPTS FOR AN ELECTRONIC DEVICE

(71) Applicant: Apple Inc., Cupertino, CA (US)

(72) Inventors: Charles F. Dominguez, Redwood City, CA (US); Ashima Kapur, San Jose, CA (US); Kiran Kattel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1587 days.

(21) Appl. No.: 14/475,267

(22) Filed: Sep. 2, 2014

(65) Prior Publication Data

US 2015/0347328 A1 Dec. 3, 2015

Related U.S. Application Data

(60) Provisional application No. 62/005,830, filed on May 30, 2014.

(51) Int. Cl.
*G06F 13/36* (2006.01)
*G06F 13/24* (2006.01)
*G06F 9/54* (2006.01)

(52) U.S. Cl.
CPC .............. *G06F 13/24* (2013.01); *G06F 9/544* (2013.01); *G06F 2209/548* (2013.01)

(58) Field of Classification Search
CPC .. G06F 12/0835; G06F 12/1081; G06F 13/28; G06F 13/362; H04L 12/5693
USPC ................. 710/308, 305–306, 300
See application file for complete search history.

(56) References Cited

U.S. PATENT DOCUMENTS

| | | | | |
|---|---|---|---|---|
| 6,145,016 A | * | 11/2000 | Lai .................. | G06F 13/128 709/208 |
| 7,133,400 B1 | * | 11/2006 | Henderson ........ | H04L 29/06 370/389 |
| 7,200,741 B1 | * | 4/2007 | Mine ................ | G06F 9/3877 712/244 |
| 8,127,309 B1 | | 2/2012 | Huang et al. | |
| 8,155,134 B2 | * | 4/2012 | Fairhurst ........... | H04L 49/90 370/235 |
| 8,347,012 B2 | | 1/2013 | Goss et al. | |
| 2011/0177804 A1 | * | 7/2011 | Lindner ............ | H04W 76/005 455/422.1 |

(Continued)

*Primary Examiner* — Tim T Vo
*Assistant Examiner* — Kim T Huynh (57) ABSTRACT

An electronic device may include an applications processor that communicates with a peripheral input-output (I/O) device using a coprocessor. The applications processor may include a first interprocessor communications (IPC) module, whereas the coprocessor may include a second IPC module for interfacing with the first IPC module. The first IPC module may forward a group of transactions to a submission queue and may ring a submission doorbell interrupt to signal that work items are pending in the submission queue. In response, the second IPC module may dequeue the work items from the submission queue and process these items at the I/O device. The second IPC module may provide a group of completed transactions to a completion queue and may ring a completion doorbell interrupt to signal that items are pending in the completion queue. Thereafter, the completed items are forwarded to other parts of the applications processor for processing.

20 Claims, 7 Drawing Sheets (56) References Cited

U.S. PATENT DOCUMENTS

| | | |
|---|---|---|
| 2011/0320665 A1* | 12/2011 | Drapala et al. ......... G06F 13/24 710/269 |
| 2013/0024875 A1 | 1/2013 | Wang et al. |
| 2013/0198450 A1* | 8/2013 | Malwankar ........... G06F 3/0607 711/114 |
| 2014/0095651 A1* | 4/2014 | Kapil ...................... G06F 9/546 709/216 |
| 2014/0122689 A1 | 5/2014 | Park et al. |
| 2014/0181830 A1 | 6/2014 | Naik et al. |
| 2015/0198992 A1* | 7/2015 | Kumar .................. G06F 1/3293 713/320 |

* cited by examiner

METHODS FOR MITIGATING SYSTEM INTERRUPTS FOR AN ELECTRONIC DEVICE

This application claims the benefit of provisional patent application No. 62/005,830, filed May 30, 2014, which is hereby incorporated by reference herein in its entirety.

BACKGROUND

This relates to electronic devices, and more particularly, to electronic devices with wireless communications capabilities.

An electronic device having wireless communications capabilities is typically provided with wireless communications circuitry configured to handle some type of wireless access technology. The wireless communications circuitry often includes a baseband processor for handling a given wireless communications protocol, a wireless transceiver for transmitting and receiving wireless signals, and an antenna for radiating the transmitted signals and sensing the received signals.

Consider an example in which the wireless communications circuitry is implemented as an integrated circuit chip for handling WiFi®. This WiFi chip can be controlled using a dedicated host controller. The host controller may be coupled to a central processing unit (CPU) of the electronic device via a system bus. In order for the central processing unit to communicate with the WiFi chip, the central processing unit needs to send control signals to the host controller via the system bus. In response, the host controller can then forward appropriate control and data signals to the WiFi chip via a separate input-output bus. Configured in this way, any operation that is performed by the WiFi chip would require active management from the central processing unit. This arrangement in which the WiFi chip requires active management from the central processing unit consumes excessive power at the CPU and can take valuable time away from other user operations at the electronic device (i.e., when the central processing unit is communicating with the host controller, processes associated with other applications have to be temporarily placed on hold).

It would therefore be desirable to be able to provide an improved way of managing the wireless communications circuitry on an electronic device.

SUMMARY

An electronic device may include a main processor and a coprocessor for interfacing with an input-output device. The main processor is sometimes referred to as an applications processor or a host processor. The coprocessor is sometimes referred to as an input-output processor (IOP). In at least some embodiments of the present invention, the input-output device may be a Secure Digital Input-Output device (e.g., an SDIO client device) configured to support some type of wireless communications protocols.

The main processor may include a client driver module, an SDIO library module, and a first interprocessor communications (IPC) module. The coprocessor may include a second interprocessor communications (IPC) module and an SD host controller (SDHC) driver. The first and second IPC modules may sometimes be referred to as communications management modules or transaction management modules. The coprocessor may be coupled to the SDIO client device through an SD host controller. The coprocessor and the SD host controller are sometimes referred to collectively herein as an SDIO subsystem. The SD host controller and the SDIO client device are sometimes referred to collectively as peripheral input-output hardware.

The first IPC module may be used to pass a group of submitted transactions into a submission queue (or "inbox"). When the group of submitted transactions is received in the inbox, the first IPC module may assert a submission interrupt doorbell to indicate to the coprocessor that the group of submitted transactions is pending in the inbox. The second IPC module may also be used to pass a group of completed transactions into a completion queue (or "outbox"). When the group of completed transactions is received in the outbox, the second IPC module may assert a completion interrupt doorbell to indicate to the main processor that the group of completed transactions is pending in the outbox. The contents of the submission queue and the completion queue may be stored in a shared system memory that is accessible to both the first and second IPC modules.

While the coprocessor is processing the group of submitted transactions obtained from the inbox, the coprocessor may temporarily disable use of the submission interrupt doorbell to avoid any interrupts to the coprocessor. Similarly, while the main processor is processing the group of completed transactions obtained from the completion queue, the main processor may temporarily disable use of the completion interrupt doorbell to avoid interrupts to the main processor. When at least one of the submitted transactions is completed, the second IPC module may configure a timer to expire based on the minimum of the transaction latency requirement of that particular completed transaction and a current deadline at the timer. When the timer expires (or "fires"), the second IPC module may send the completion interrupt doorbell to the first IPC module.

In at least some embodiments, the first IPC module may be used to monitor a fill level of the inbox, whereas the second IPC module may be used to monitor a fill level of the outbox. When the fill level of the inbox falls below a predetermined threshold, the second IPC module may be used to send an alert to the main processor to indicate to the main processor that the inbox needs to be refilled. When the fill level of the outbox falls below a predetermined threshold, the first IPC module may be used to send an alert to the coprocessor to indicate to the coprocessor that the output needs to be refilled.

Further features of the present invention, its nature and various advantages will be more apparent from the accompanying drawings and the following detailed description.

DETAILED DESCRIPTION

Figure 1:
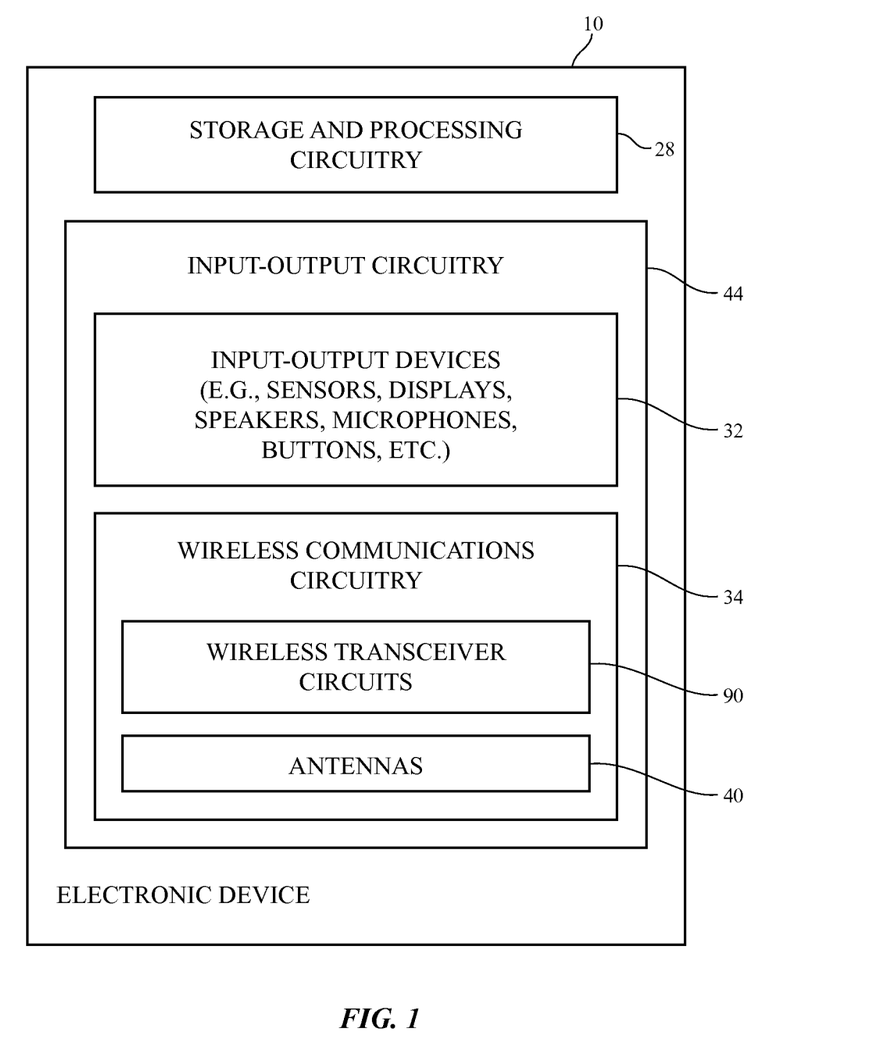
FIG. 1 is a schematic diagram of illustrative circuitry in an electronic device in accordance with an embodiment.

FIG. 1 is a schematic diagram showing illustrative components that may be used in an electronic device 10. Electronic device 10 may, in general, be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. Transceiver circuitry 90 may include wireless local area network transceiver circuitry that may handle 2.4 GHz and 5 GHz bands for WiFi® (IEEE 802.11) communications and that may handle the 2.4 GHz Bluetooth® communications band, cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (e.g., to handle voice data and non-voice data), satellite navigation system circuitry such as global positioning system (GPS) receiver circuitry 42 for receiving GPS signals at 1575 MHz or for handling other satellite positioning data, and/or circuitry for other short-range and long-range wireless links if desired. For example, wireless communications circuitry 34 may include 60 GHz transceiver circuitry, circuitry for receiving television and radio signals, paging system transceivers, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may also include near field communications (NFC) circuitry (not shown). The near field communications circuitry may produce and receive near field communications signals to support communications between device 10 and a near field communications reader or other external near field communications equipment. Near field communications may be supported using loop antennas (e.g., to support inductive near field communications in which a loop antenna in device 10 is electromagnetically near field coupled to a corresponding loop antenna in a near field communications reader). Near field communications links typically are generally formed over distances of 20 cm or less (i.e., device 10 must be placed in the vicinity of the near field communications reader for effective communications).

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different hands and combinations of bands. For example, one type of antenna may be used in forming a local wireless link antenna and another type of antenna may be used in forming a remote wireless link antenna. In addition to supporting cellular telephone communications, wireless local area network communications, and other far-field wireless communications, the structures of antennas 40 may be used in supporting near field communications. The structures of antennas 40 may also be used in gathering proximity sensor signals (e.g., capacitive proximity sensor signals).

Radio-frequency transceiver circuitry 90 does not handle near field communications signals and is therefore sometimes referred to as far field communications circuitry or non-near field-communications circuitry. The near field communications transceiver circuitry may be used in handling near field communications. With one suitable arrangement, near field communications can be supported using signals at a frequency of 13.56 MHz. Other near field communications bands may be supported using the structures of antennas 40 if desired. Transceiver circuitry 90 may handle non near field communications frequencies (e.g., frequencies above 700 MHz or other suitable frequency).

The wireless communications circuitry is sometimes implemented as a separate input-output (I/O) device. Consider, for example, a scenario in which the wireless communications circuitry is implemented as a separate integrated circuit chip that is configured to support WiFi®. In a conventional system, this WiFi chip has to be actively managed using a central processing unit (CPU) of the system. A host controller may be interposed between the central processing unit and the WiFi chip. The host controller is used to receive commands from the central processing unit and to forward the received commands to the WiFi chip for execution. Configured in this way, the central processing unit has to dedicate time to actively manage the WiFi chip by interfacing directly with the host controller, which can be time consuming and power consuming for the central processing unit.

In accordance with an embodiment, a separate input-output processor (sometimes referred to herein as the "coprocessor") may be provided in addition to the central processing unit (sometimes referred to herein as the "main processor") for managing a corresponding I/O device. The coprocessor may operate independently from the main processor and may be dedicated to optimize the performance of the corresponding I/O that it serves. Offloading the I/O management operations from the main processor to the coprocessor can help to free up time at the main processor to handle other user applications.

Figure 2:
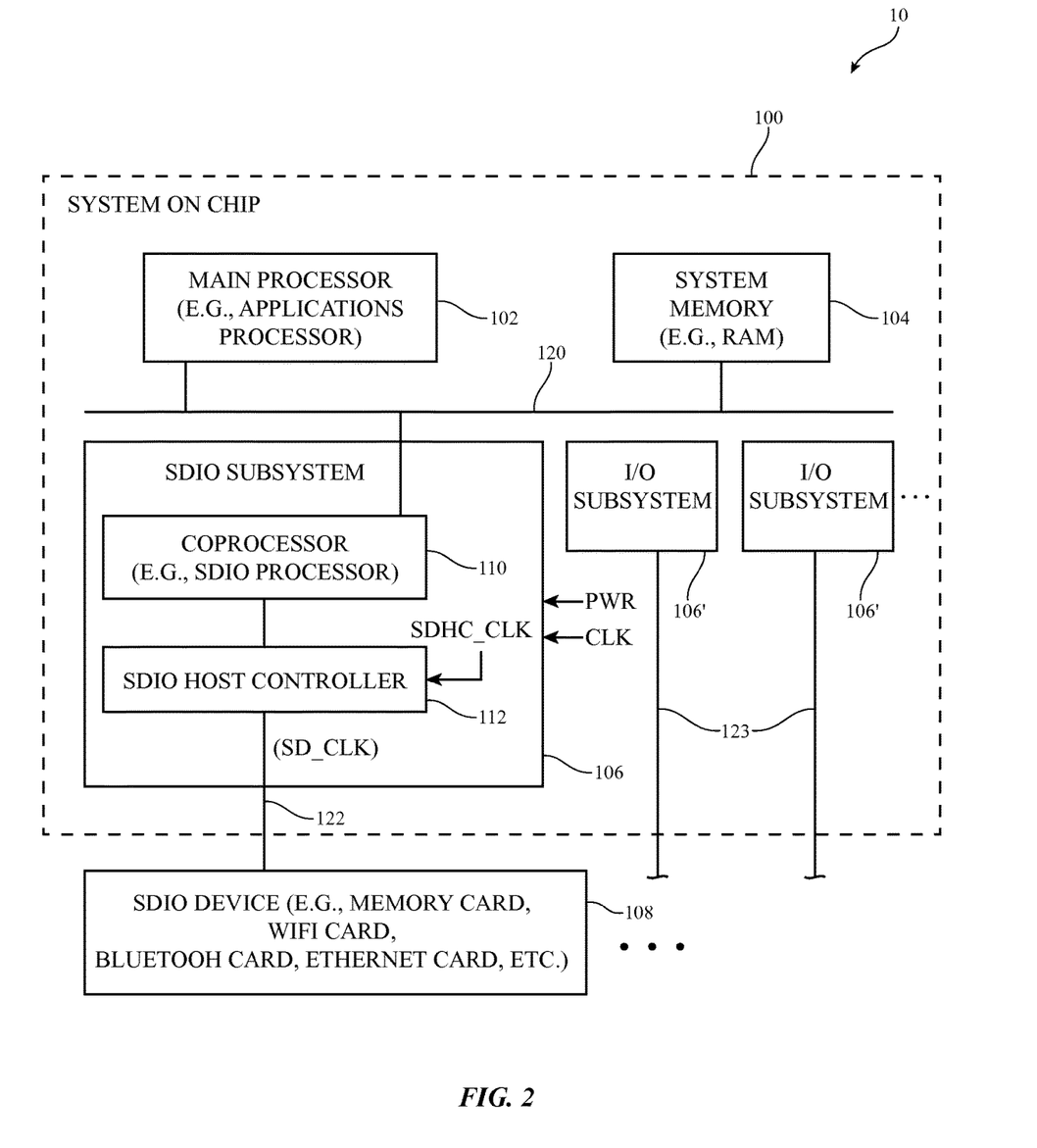
FIG. 2 is a diagram of showing how a main processor leverages a coprocessor to interact with an input-output device in accordance with an embodiment.

FIG. 2 shows a system that can be implemented on device 10. As shown in FIG. 2, device 10 may include a main processor 102, system memory 104, and one or more I/O subsystems 106 that can be used to interact with various I/O devices. Main processor 102 may be used to run one or more applications on device 102, and is sometimes referred to as an "applications processor" (AP) or a "host processor." For example, the applications processor may be used to run software on device 10 such as internet browsing applications, voice-over-internet-protocol (VOIP) telephone call applications, email applications, media playback applications, operating system functions, mobile transactions applications, NFC applications, etc.

Applications processor 102 may be coupled to a system bus 120. System bus 120 may serve as a computer bus that couples the applications processor to computer memory such as system memory 104. System bus 120 may be used to convey data signals, address signals for determining where the data should be sent, control signals for determining the desired operation, and/or other associated signals. Connected in this way, the applications processor may access system memory 104 to obtain system instructions, digital logic state information, and/or other temporary or permanent data that is required for proper operation of the system. System memory 104 is typically implemented using voltage memory circuitry (e.g., random access memory devices). If desired, system memory 104 may also be implemented using non-volatile memory (e.g., flash memory or various types of read-only memory). Applications processor 102 and system memory 104 of FIG. 2 can be considered to be a part of the storage and processing circuitry 28 of FIG. 1.

To reduce cost and improve modularity, system bus 120 may also be used to couple the applications processor to various I/O subsystems 106 and 106'. Each of the I/O subsystems may serve as an interface between the applications processor and a corresponding I/O device. In the example of FIG. 2, an I/O subsystem 106 serves as a Secure Digital Input Output (SDIO) subsystem for interacting with a corresponding client device such as SDIO device 108. SDIO device 108 may be an extension of the Secure Digital® (SD) standard which combines data storage with input-output functions. As examples, SDIO device 108 may be used to support GPS receivers, modems, near field communications (NFC) readers, radio tuners, TV tuners, radio-frequency identification (RFID) readers, and also wireless network adapters to WiFi, Bluetooth, Ethernet, etc. In an example where the SDIO device 108 is a WiFi adapter, SDIO device 108 along with SDIO subsystem 106 may be considered collectively as being part of wireless communications circuitry 34 (see, FIG. 1).

SDIO device 108 may be coupled to the SDIO subsystem 106 via an SDIO bus 122. In general, bus 122 connecting an I/O subsystem to a corresponding I/O device can be used to convey information according to a communications standard that governs the operation of the I/O device. Still referring to FIG. 2, SDIO subsystem 106 may include a coprocessor 110 and a host controller 112. In the example of FIG. 2 in which coprocessor 110 is being used to serve as a dedicated processor for managing the operations of SDIO device 108, coprocessor 110 may be referred to as an SDIO processor. The SDIO processor 110 may be responsible for all SDIO transactions and interrupt management, including all interactions with the SDIO host controller 112 (e.g., coprocessor 110 may be used to manage and mitigate interrupts from the host controller 112). The SD host controller 112 and the SDIO device 108 are sometimes considered collectively as peripheral I/O hardware.

Device 10 may also include other I/O subsystems such as I/O subsystems 106' that are coupled to the applications processor 102 via the system bus 120. These I/O subsystems 106' may be coupled to other peripheral devices via respective I/O paths 123 using interfaces other than the SDIO interface. In the example of FIG. 2, the main processor 102, system memory 104, and the various SDIO subsystem components may be integrated onto a single chip 100 (sometimes referred to as a system on a chip or "SoC" 100). 10 device 108 may be implemented as a separate chip or "card" or may be embedded as a part of system 100. This is merely illustrative. In general, main processor 102 may control any suitable number of IO devices using IO subsystems 106 each having their own dedicated transactions management processor.

Figure 3:
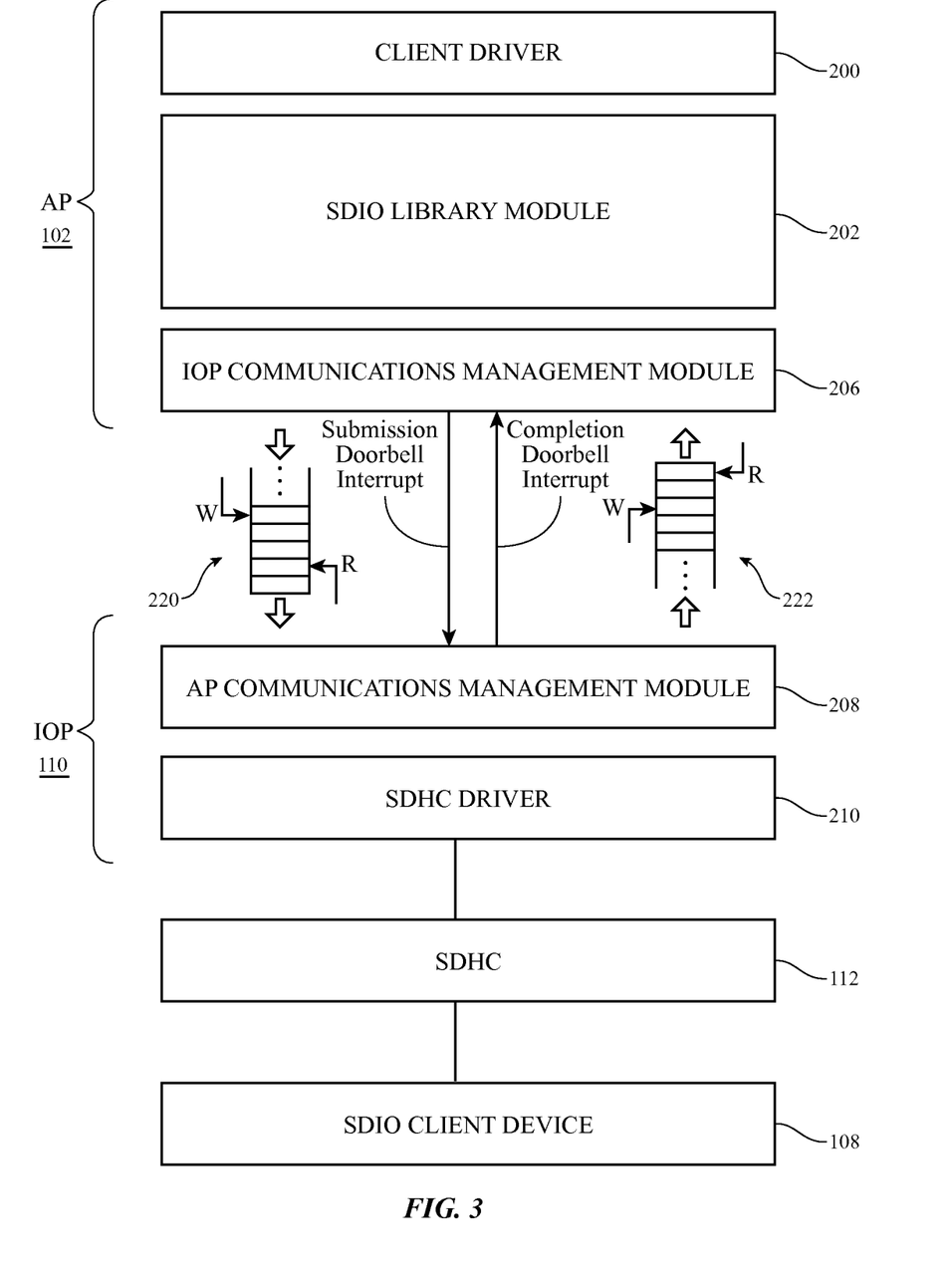
FIG. 3 is a diagram showing illustrative functional layers in a system of the type shown in FIG. 2 in accordance with an embodiment.

FIG. 3 is a diagram showing different functional layers involved in communications between applications processor 102 and a coprocessor 110 of an I/O subsystem 116 in the system of the type described in connection with FIG. 2. Coprocessor 110 may sometimes be referred to herein as an I/O processor or "IOP." As shown in FIG. 3, the applications processor 102 may have associated functional layers that include a client driver 200, a SDIO library module 202, and an IOP communications management module 206 (sometimes referred to as the coprocessor communications management module). Client driver 200 may represent a computer program that operates or controls a corresponding peripheral device that is attached to the system. For example, driver 200 may serve as a software interface to SDIO client device 108 without having to know the precise details related to the operations of device 108. During normal operation, driver 200 can make calls or issue other operations that are invoked by a higher-level application code.

The SDIO library module 202 may serve as a translator that converts commands issued by the client driver 200 into transactions objects that are specific to the actual hardware device that the driver is targeting. These transactions objects can then be passed on to the IOP communications management module 206. Module 206 may be used to manage the interprocessor communications with the coprocessor 110.

The coprocessor 110 may include a corresponding AP communications management module 208 that interfaces directly with module 206. The AP communications management module 208 may be used to manage all interprocessor communications with the applications processor 102. Module 206 may selectively pass one or more transactions objects to a SD host controller (SDHC) driver module 210, which is also considered to be a part of the coprocessor. Driver 210 may serve to communicate with the SDIO client device 108 by interacting directly with the SD host controller 112. Modules 206 and 208 can sometimes be referred to as interprocessor communications (IPC) modules or transactions management modules.

In accordance with one suitable arrangement, buffer modules such as First-In-First-Out (FIFO) data structures 220 and 222 may be used to pass I/O transactions objects (sometimes referred to here as "work items") between the main applications processor and the I/O coprocessor. FIFO 220 may serve as a queue for buffering pending transactions from the main processor and is sometimes referred to herein as the "inbox" or an inbox queue, whereas FIFO 222 may serve as a queue for buffering completed transactions from the coprocessor and is sometimes referred to herein as the "outbox" or an outbox queue. Queues 220 and 222 may each have read (R) and write (W) pointers that indicate their respective fill levels. The contents and pointer information associated with these FIFO queues may be stored on a shared memory (e.g., system memory 104 of FIG. 2) and may therefore be visible to both processors (e.g., both interprocessor communications management modules 206 and 208 should be able to monitor the fill levels of both the inbox queue and the outbox queue). Queues 220 and 222 may be implemented as ring FIFOs (as an example).

In accordance with another embodiment, interrupt signals may also be sent between the applications processor and the coprocessor to signal to each processor when it needs to take action on the FIFOs. As shown in FIG. 3, the coprocessor management module 206 may be used to send an interrupt signal (sometimes referred to herein as a "submission doorbell interrupt") to indicate to the coprocessor that the coprocessor needs to pull transactions from the inbox queue to process. Conversely, the applications processor management module 208 may be used to send an interrupt signal (sometimes referred to herein as a "completion doorbell interrupt") to indicate to the applications processor that it needs to pull transactions from the outbox queue to process. In yet other scenarios, either one of interprocessor communications (IPC) modules 206 and 208 may be used to signal the need for additional transactions to be filled at the inbox or at the outbox. This ensures that the I/O system remains fully pipelined to optimize the usage of the coprocessor.

In certain applications, the traffic that is being handled by the I/O coprocessor such as WiFi traffic may be sensitive to latency, required high bandwidth, and can be very fair unpredictable. For example, it is usually not possible for an I/O subsystem 106 to know ahead of time when a transaction will be requested. In other words, network traffic can be thought of as random events which tend to be highly correlated in time or "bursty. In general, the power utilization of the client device 108 and the corresponding I/O subsystem 106 is strongly affected by the latency with which transactions are processed. A lower latency may translate into faster completions and more time that the processors spend in low-power states. As a result, it may be desirably to minimize the transactions latency.

Beyond the network performance, it may also be desirable to optimize the performance of the system as a whole when under high traffic load due to network traffic. For example, the SDIO host controller 112 in FIG. 2 may generate at least two interrupts per SDIO transaction, which are both received by the coprocessor. A first interrupt is sent for the command phase of the SDIO transaction, whereas a second interrupt is sent for the transfer phase of the transaction. Additional interrupts may be generated in response to other error conditions. The completed transactions are then forwarded to the main processor for handling by the client driver 200. It is generally desirable to minimize the interrupt rate to both the main processor and the coprocessor.

Figure 4:
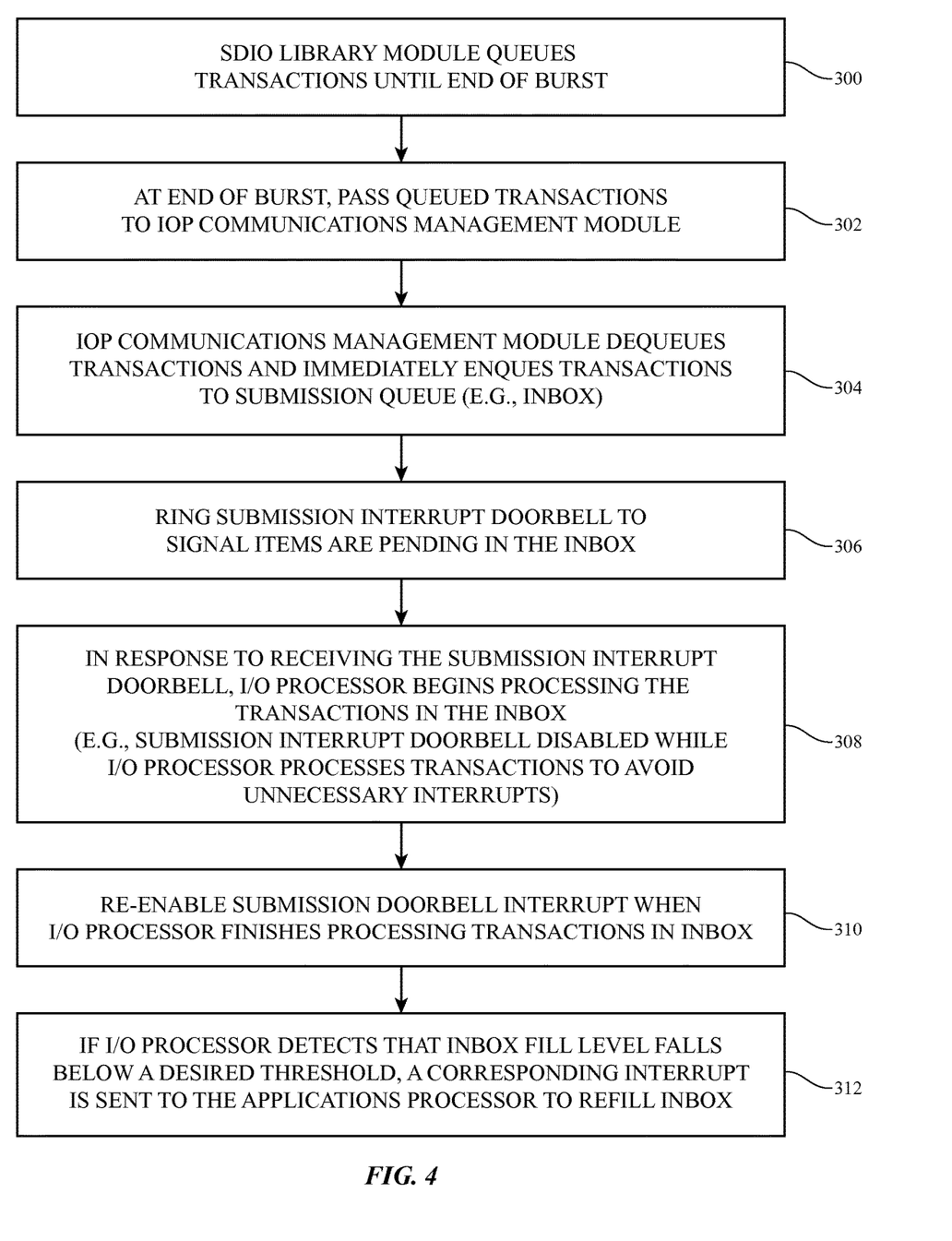
FIG. 4 is a flow chart of illustrative steps involved in operating the main processor to submit transactions to the coprocessor in accordance with an embodiment.
Figure 5:
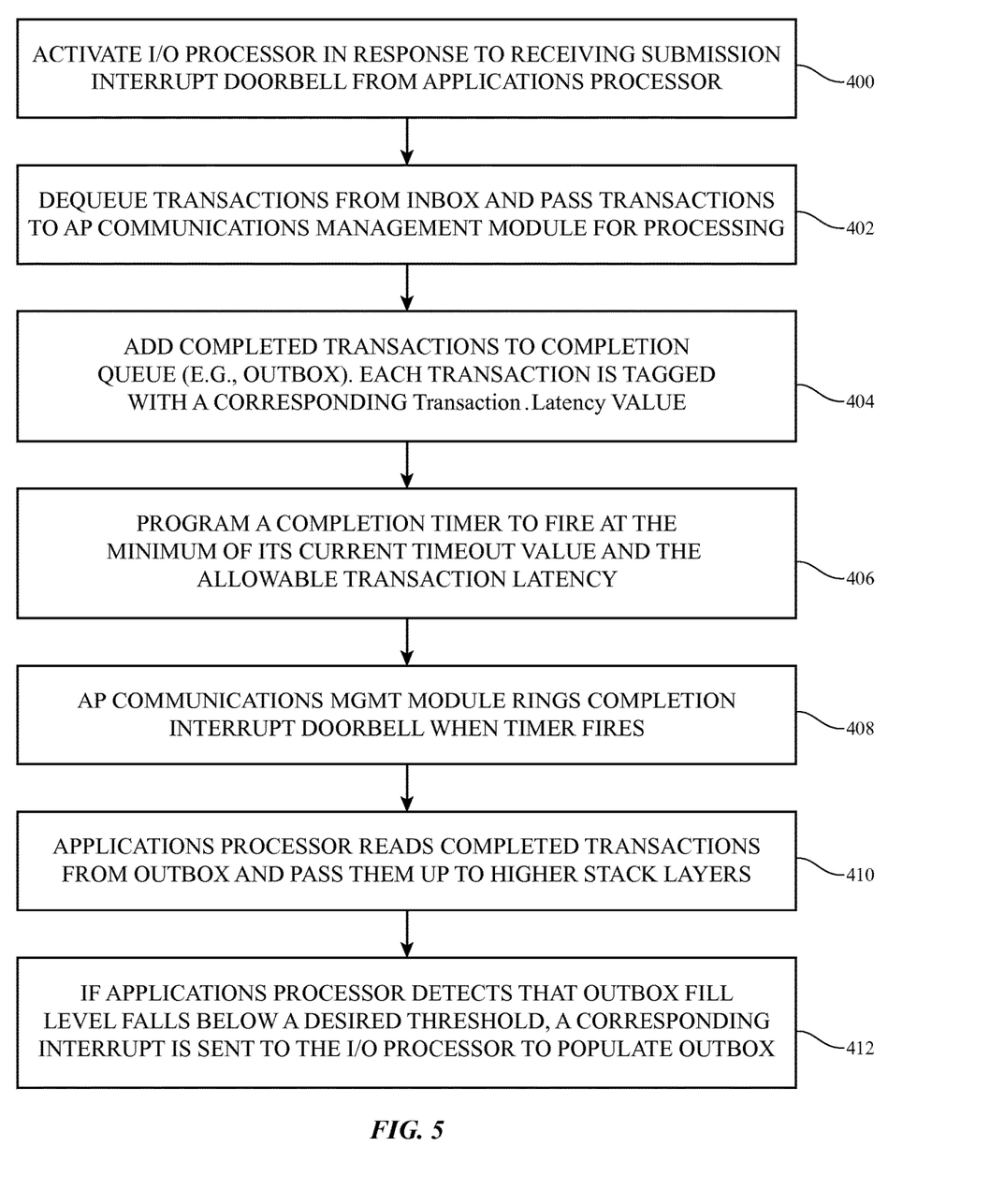
FIG. 5 is a flow chart of illustrative steps involved in operating the coprocessor to execute the submitted transactions and to transfer completed transactions back to the main processor in accordance with an embodiment.

Steps for minimizing the interrupt rate during interprocessor communications are shown in FIGS. 4 and 5. FIG. 4 is a flow chart of illustrative steps involved in operating the main processor to submit transactions to the coprocessor. At step 300, the SDIO library module 202 (see, FIG. 3) may translate commands into transactions and may queue the transactions until the end of a burst, and the queued transactions may then be passed to the underlying coprocessor communications management module 206. In general, the applications processor uses hints from the upper layers of the network stack to identify boundaries of SDIO transactions bursts (e.g., by tagging a bit indicating that more transactions will follow).

At the end of a burst, the SDIO library module may pass the queued transactions as a group to management module 206 (step 302). At step 304, management module 206 may dequeue the received transactions and immediately enqueue them to the submission queue (e.g., module 206 may load the transactions into the inbox).

At this point, the coprocessor communications management module 206 may ring a submission interrupt doorbell to signal to the coprocessor that one or more items are pending in the inbox (step 306). The submission interrupt doorbell may sometimes be referred to as an "inbox active" doorbell. In response to receiving the submission interrupt alert, the coprocessor may begin processing the transactions in the inbox (step 308). While the coprocessor is processing the transactions, the submission interrupt doorbell function may be disabled to avoid unnecessary interrupts caused by the applications processor enqueuing additional items to the inbox. The submission doorbell interrupt function may be re-enabled as soon as the coprocessor finishes processing all the transactions in the inbox (step 310)

At any point in time, if the coprocessor detects that the inbox FIFO depth has fallen below a predetermined threshold, an "inbox low" interrupt may be sent to the applications processor to indicate that the inbox needs to be refilled (step 312). In such scenarios, the applications processor may only opportunistically refill the buffer at its earliest availability to honor the refill request without incurring an immediate host interrupt. In another scenario in which the coprocessor detects that the inbox FIFO depth has fallen critically low, the coprocessor may signal an "inbox critically low" interrupt to the applications processor. If the applications processor has any transactions pending, this interrupt would trigger an immediate refill. Operating the system in this way helps keep the inbox pipelined and the coprocessor fully utilized.

The coprocessor may then proceed to pass these transactions to the SDIO hardware. This may result in the SDIO hardware to perform some action, which can then relay back new information in the form of completed transactions. The completed transactions may then be added to the outbox. The application processor may dequeue the completed transactions from output as a group and pass them up to the client driver as a burst. Each completion may be tagged to a "more" bit to indicate to the higher networking layers that there are more completions to process.

FIG. 5 is a flow chart of illustrative steps involved in operating the coprocessor to execute the submitted transactions and to transfer completed transactions back to the main processor in accordance with an embodiment. At step 400, the coprocessor may be activated in response to receiving a submission interrupt doorbell from the applications processor. At 402, the coprocessor may then begin to dequeue the transactions from the inbox for processing. In particular, each dequeued transactions may be passed to the SDHC driver 210 for processing. Driver 210 may take each transaction object and manage the SDIO host controller programming needed to issue the transaction. The driver 210 may also handle the command and transfer completion interrupts from the SDIO host controller 112 and accumulate the transaction status information for the completion.

When an SDIO transaction is complete, the coprocessor will add the completed transactions to the completion queue (e.g., to the outbox). Each SDIO transaction may be tagged with a corresponding "Transaction.Latency" value. This transaction latency value may be used to indicated how long a completed transaction can wait before the applications processor must be notified.

For each completed transaction, the coprocessor may program a completion timer (step 406). The completion timer may be set to fire at the minimum of its current timeout value and the allowable transaction latency. A timer configured in this way may therefore serve to allow all transactions that fall within a certain window (e.g., a 100 µs window) to be sent to the applications processor via a single interrupt, while still bounding how long a given transaction can wait.

When the timer fires (at step 408), the AP communications management module 208 may ring the completion interrupt doorbell (sometimes referred to as an "outbox active" doorbell). When the completion interrupt doorbell is asserted, the applications processor may read the completed transactions from the outbox and pass them up to the higher network stack layers for processing (step 410). While the main processor is processing the transactions, the completion interrupt doorbell function may be disabled to avoid unnecessary interrupts caused by the coprocessor enqueuing additional items to the outbox. The completion doorbell interrupt function may be re-enabled as soon as the main processor finishes processing all the transactions in the outbox.

In scenarios in which the applications processor detects that the outbox FIFO dept falls below a desired threshold, an "outbox low" interrupt may be sent to the coprocessor to indicate that the outbox needs to be refilled (step 412). This informs the coprocessor that the main processor can process more completions. In another scenario in which the applications processor detects that the outbox FIFO depth has fallen critically low, the applications processor may signal an "outbox critically low" interrupt to the coprocessor. If the coprocessor has any completed transactions pending to be placed within the outbox, this interrupt would trigger an immediate refill. Operating the system in this way helps keep the outbox pipelined and can minimize the number of interrupts to the applications processor.

Figure 6:
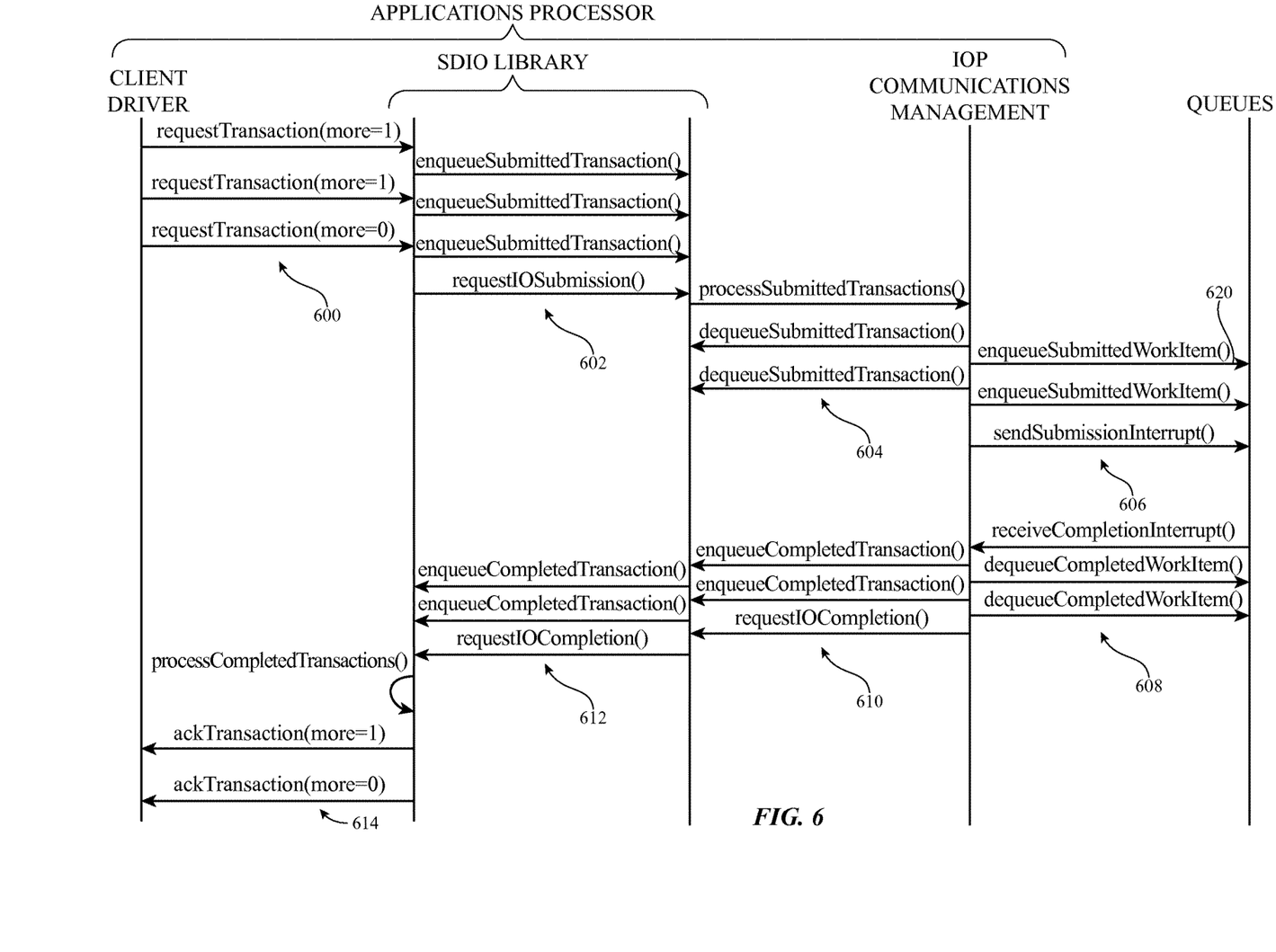
FIG. 6 is a timing diagram showing an illustrative sequence of commands that may be issued at the main processor when submitting new transactions to the coprocessor and processing completed transactions received from the coprocessor in accordance with an embodiment.

FIG. 6 shows an illustrative flow of commands at the applications processor. At steps 600, the client driver may send transaction request commands to the SDIO library module. As described previously, these commands may be tagged with a "more" bit indicating whether there are more subsequent requests. At steps 602, the submitted transactions may be enqueued until there are no more requests from the client driver, at which point in time a "requestIOSubmission( )" command can be issued to dequeue the submitted transactions.

At steps 604, the transactions may be forwarded to the coprocessor communications management module. At steps 606, the coprocessor communications management module may fill the inbox queue with the submitted transactions (indicated as submitted "work items" in FIG. 6). Once the work items have been submitted to the inbox, the coprocessor communications management module may send a submission interrupt doorbell to the coprocessor.

At steps 608, the coprocessor communications management module may receive a completion interrupt doorbell from the coprocessor and then dequeue the completed work items from the outbox. At steps 610, the completed work items may be passed to the SDIO library module. At steps 612, the completed work items may be queued at the SDIO library module until the end of burst. At steps 614, transaction complete acknowledgement commands may be sent from the SDIO library to the client driver. If desired, these completion commands may also be tagged with "more" bit to indicate to the higher networking layers whether there are more completions to process.

In certain embodiments of the present invention, at least some parts of the SDIO subsystem may be power gated to further reduce the power consumption of the entire system. For example, during step 620 of FIG. 6 (e.g., upon enqueuing a first work item at the inbox), a subsystem clock and/or power may be enabled/ungated (see, signals PWR and CLK feeding into SDIO subsystem 106 in FIG. 2). In other words, subsystem 106 may be placed in an idle state prior to receiving any transactions at the submission queue (signals CLK and PWR may be deactivated or "gated" during the idle state). The subsystem power and clock signals may be turned on as soon as transactions begin to arrive at the inbox queue.

On the other hand, the subsystem clock and power signals may be turned off when there is nothing left in the submission queue, when there is nothing left in the completion queue, when there are no active work items currently being processed, and/or when there is nothing currently pending in the upper network stack layers for the SDIO. The gating of the subsystem CLK and PWR may be controlled by the coprocessor communications management module (as an example). There is merely illustrative. If desired, each I/O subsystem may be individually gated in this way using the applications processor.

Figure 7:
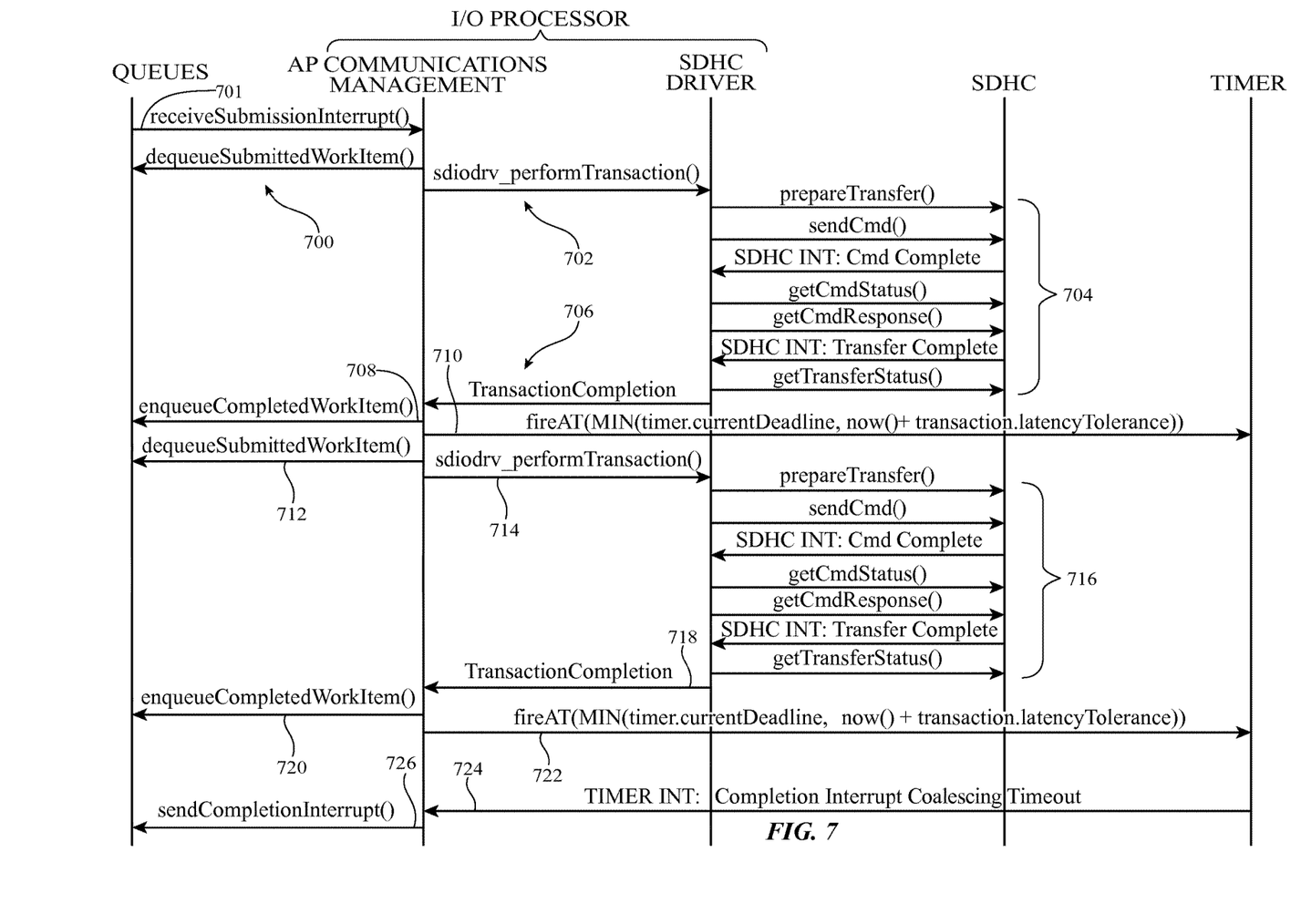
FIG. 7 is a timing diagram showing an illustrative sequence of commands that may be issued at the coprocessor when handling new transactions submitted from the main processor and when handling completed transactions produced from the input-output device in accordance with an embodiment.

FIG. 7 is a timing diagram showing an illustrative sequence of commands that may be issued at the coprocessor when handling new transactions submitted from the main processor and when handling completed transactions produced from the SDIO hardware.

At steps 700, the AP communications management module at the coprocessor may receive the submission interrupt doorbell from the inbox queue and may dequeue the first submitted work item from the inbox. At step 702, the AP communications management module may send a "performTransaction( )" command to the SDHC driver (e.g., driver 210 in FIG. 3) that direct the SDHC driver to initiate communications with the SD host controller (e.g., SDHC 112 in FIG. 3). At step 704, the SDHC driver may send a series of commands and transfer requests to the SD host controller so that desired operations can be performed at the SDIO client device. In response, the SD host controller may send a first completion interrupt signal during the command phase and a second completion interrupt signal during the transfer phase. At step 706, the SDHC driver may send a transactions complete notification back to the AP communications management module. At step 708, the AP communications management module may enqueue the completed work item to the outbox queue.

At step 710, the AP communications management module may send a command to the timer to direct the timer to fire at the minimum of its current deadline and the transaction latency tolerance of the currently completed work item. Consider a first example in which a work item that has been completed at the 96.5 µs mark has a latency tolerance of 50 µs and the current deadline is to fire at the 100 µs mark (which is only 3.5 µs away). In this example, the timer will fire at the 100 µs mark (which is the minimum of 100 µs and 146.5 µs) to ensure that previously completed work items have their latency tolerance deadlines satisfied. Consider a second example in which a work item that has been completed at 85.7 µs has a latency tolerance of 10 µs and the current deadline is to fire at the 100 µs mark (which is 14.3 µs away). In this example, the timer will instead fire at the 95.7 µs mark (which is the minimum of 100 µs and 95.7 µs) to ensure that the latency requirement of the currently completed work item is satisfied.

At step 712, the AP communications management module may dequeue the second submitted work item from the inbox. At step 714, the AP communications management module may send a "performTransaction( )" command to the SDHC driver. At step 716, the SDHC driver may send a series of commands and transfer requests to the SD host controller so that desired operations can be performed at the SDIO client device. In response, the SD host controller may send a first completion interrupt signal during the command phase and a second completion interrupt signal during the transfer phase. At step 718, the SDHC driver may send a transactions complete notification back to the AP communications management module. At step 720, the AP communications management module may enqueue the completed work item to the outbox queue. At step 722, the AP communications management module may send a command to the timer to direct the timer to fire at the minimum of its current deadline and the transaction latency tolerance of the currently completed work item.

Whenever the timer fires (i.e., whenever the timer expires), the timer may send a timer interrupt signal to the AP communications management module (step 724). In response, the AP communications management module may send a completion interrupt doorbell back to the applications processor.

In another suitable arrangement, at least some parts of the SDIO subsystem may be clock gated to further reduce the power consumption of the SDIO subsystem. For example, during steps 704 and 716 of FIG. 7 (e.g., when the SDHC driver is talking with the SD host controller), an SDIO bus clock signal may be activated/ungated (see, clock signal SD_CLK in FIG. 2). At other times, the SD host controller may be idle, so SD_CLK may be deactivated. As another example, the SD host controller may itself receive an SDHC clock signal (see, clock signal SDHC_CLK in FIG. 2) that is activated during step 701 when the applications communications management module receives the submission interrupt doorbell. The SDHC_CLK signal may deactivated when there are no more items in the submission queue and when the SD host controller is no longer active (e.g., at step 720). These examples are merely illustrative. If desired, the SDIO host controller and the SDIO bus can be gated in other suitable ways.

Operating a system in the way described above can offer a variety of benefits. As an example, this scheme can allow for extensive interrupt coalescing and aggregation. In other words, multiple pending SDIO transactions may be issued from the main processor to the coprocessor with a single interrupt, independent of the I/O commands issued by the higher networking layers and the inbox FIFO depth. Multiple completed SDIO transactions may be sent from the coprocessor back to the main processor with a single interrupt, independent of the SDIO bus transaction timing and the outbox FIFO depth. In general, multiple interrupts for different events may be collected and may be serviced via a single physical interrupt event instead of multiple separate events to minimize the number of interrupts to the main processor.

As another example, this scheme also allows for interrupt suppression. Either the software on the main processor or the coprocessor (e.g., the coprocessor transactions management module or the main processor transactions management module) may be configured to opportunistically check the interrupt status when they are already active and take appropriate action immediately, thereby avoiding another interrupt. The software may also disable generation and receipt of interrupts for events that are irrelevant to the subsystem's current operating state, which can help avoid spurious interrupts. In at least some embodiments, the module that is pulling and processing items from either the inbox or the output FIFO (sometimes referred to as the "consumer") may do so without requiring an interrupt from the module that is filling the FIFO (sometimes referred to as the "producer"), which can help suppress unnecessary FIFO interrupts.

As yet another example, this scheme also allows for optimal pipelining of the SDIO subsystem. The consumers may signal a low FIFO state to the producers without requiring the consumer to take an interrupt. The consumer may also forcibly interrupt the producers if the FIFO drops critically low, ensuring a timely refill and avoiding stalls.

The examples described above in which the main processor and the coprocessor are used to handle SDIO transactions are merely illustrative and do not limit the scope of the present invention. In general, these interrupt aggregation/suppression and transaction pipelining techniques may be applied to any other type of input-output standards.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. A method for operating an electronic device that includes a main processor and a coprocessor for interfacing with an input-output device, comprising:
   with the main processor, passing a group of submitted transactions into a submission queue;
   in response to receiving the group of submitted transactions in the submission queue, using the main processor to assert a submission interrupt signal to indicate to the coprocessor that the group of submitted transactions is pending in the submission queue;
   in response to receiving the asserted submission interrupt signal, using the coprocessor to obtain the group of submitted transactions from the submission queue;
   while the coprocessor is processing the group of submitted transactions obtained from the submission queue, temporarily disabling use of the submission interrupt signal to avoid interrupts to the coprocessor;
   with the coprocessor, passing a group of completed transactions into a completion queue; and
   in response to receiving the group of completed transactions in the completion queue, using the coprocessor to assert a completion interrupt signal to indicate to the main processor that the group of completed transactions is pending in the completion queue, wherein the completion interrupt signal is different than the submission interrupt signal;
   in response to receiving the asserted completion interrupt signal, using the main processor to obtain the group of completed transactions from the completion queue; and
   while the main processor is processing the group of completed transactions obtained from the completion queue, temporarily disabling use of the completion interrupt signal to avoid interrupts to the main processor.

2. The method defined in claim 1, further comprising:
   monitoring a fill level of the submission queue using a coprocessor communications management module at the main processor, wherein the coprocessor communications management module is also used to assert the submission interrupt signal.

3. The method defined in claim 2, further comprising:
   monitoring a fill level of the completion queue using a main processor communications management module at the coprocessor, wherein the main processor communications module is also used to assert the completion interrupt signal.

4. The method defined in claim 1, wherein passing the group of submitted transactions into the submission queue comprises forwarding a complete burst of continuous transactions to the submission queue.

5. The method defined in claim 3, further comprising:
   with the main processor communications management module, sending an alert to the main processor when the fill level of the submission queue falls below a predetermined threshold.

6. The method defined in claim 2, further comprising:
   with the coprocessor communications management module, sending an alert to the coprocessor when the fill level of the completion queue falls below a predetermined threshold.

7. The method defined in claim 1, wherein the electronic device also includes a system memory that is accessible to both the main processor and the coprocessor, the method further comprising:
   storing contents of the submission queue and the completion queue in the system memory.

8. An electronic device, comprising:
   an applications processor for running user applications on the electronic device;
   an input-output device; and
   an input-output subsystem that is coupled between the applications processor and the input-output device, wherein the input-output subsystem includes a coprocessor for actively managing communications with the input-output device, wherein the input-output subsystem receives a subsystem clock, and wherein the subsystem clock is ungated only when the input-output subsystem is actively processing transactions generated by the applications processor.

9. The electronic device defined in claim 8, wherein the input-output subsystem further includes an input-output host controller, wherein an input-output bus is interposed between the input-output host controller and the input-output device, and wherein the input-output bus is controlled by a bus clock signal that is ungated only when the input-output subsystem is actively communicating with the input-output host controller.

10. The electronic device defined in claim 9, wherein the applications processor is configured to output a submission interrupt doorbell to the input-output subsystem, wherein the input-output host controller is controlled by a host controller clock signal, and wherein the host controller clock signal is ungated after the input-output subsystem receives the submission interrupt doorbell and is gated before the input-output subsystem outputs a completion interrupt doorbell to the applications processor.

11. The electronic device defined in claim 8, wherein the coprocessor comprises a transactions management module configured to receive a submission interrupt signal from the applications processor.

12. The electronic device defined in claim 11, wherein the coprocessor further comprises a driver module configured to receive a command from the transactions management module, and wherein the command directs the driver module to initiate communications with a peripheral input-output device coupled to the input-output subsystem.

13. The electronic device defined in claim 12, wherein the driver module is further configured to receive an additional interrupt signal from the peripheral input-output device.

14. A method of operating an electronic device comprising:
   with an applications processor, generating transactions;
   with an input-output subsystem, receiving a subsystem clock, wherein the input-output subsystem is coupled between the applications processor and an input-output device and wherein the input-output subsystem includes a coprocessor;
   with the coprocessor, actively managing communications with the input-output device; and
   ungating the subsystem clock only when the input-output subsystem is actively processing the transactions.

15. The method of claim 14, wherein the input-output subsystem further comprises an input-output host controller, the method further comprising:
   controlling an input-output bus between the input-output host controller and the input-output device using a bus clock signal; and ungating the bus clock signal while the input-output subsystem is actively communicating with the input-output host controller.

16. The method of claim 15, further comprising:
with the applications processor, outputting a submission interrupt doorbell; and
with the input-output subsystem, receiving the submission interrupt doorbell.

17. The method of claim 16, further comprising:
using a host controller clock signal to control the input-output host controller; and
in response to the input-output subsystem receiving the submission interrupt doorbell, ungating the host controller clock signal.

18. The method of claim 17, further comprising:
with the input-output subsystem, outputting a completion interrupt doorbell to the applications processor.

19. The method of claim 18, further comprising:
prior to outputting the completion interrupt doorbell, gating the host controller clock signal.

20. The method of claim 18, further comprising:
in response to receiving the submission interrupt doorbell, using the coprocessor to obtain at least some of the transactions from a submission queue; and
in response to receiving the completion interrupt doorbell, using the applications processor to obtain completed transactions from a completion queue.

* * * * *